R. A. Leeds.

Gate Latch.

No. 3,751. Reissued Nov. 30, 1869.

Witnesses,
Jas. A. Service
[illegible]

Inventor
R. A. Leeds
Per Munn & Co
Attorneys

N. PETERS, PHOTO-LITHOGRAPHER, WASHINGTON, D. C.

United States Patent Office.

RICHMOND A. LEEDS, OF STAMFORD, CONNECTICUT.

*Letters Patent No.* 58,268, *dated September* 25, 1866; *reissue No.* 3,751, *dated November* 30, 1869.

IMPROVEMENT IN GATE-LATCHES.

The Schedule referred to in these Letters Patent and making part of the same.

*To all whom it may concern:*

Be it known that I, RICHMOND A. LEEDS, of Stamford, in the county of Fairfield, and State of Connecticut, have invented a new and useful Improvement in Gates; and I do hereby declare that the following is a full, clear, and exact description thereof, reference being had to the accompanying drawing, which forms part of this specification.

The nature of my invention consists in the arrangement, horizontally across the face of the front stile of a gate, of one or more eccentrically-hung dogs or plates. when used in combination with a lug or projecting piece secured to the fence-post at the front of the gate, whereby the gate can be opened, either toward or from the operator, by merely employing one hand to release the catch, and thereby much more easily and conveniently than hitherto, the gate closing automatically.

It further consists in a novel combination of the parts of an automatic gate-catch, whereby accuracy in operation, simplicity of construction, and cheapness are effected.

In the drawings—

Similar letters of reference indicate like parts in both figures.

A designates a gate, which is hinged to a post, B, so as to swing in a direction either inward or outward.

D D are two plates, which, in the present instance, are sector-shaped.

Each plate is provided with a handle or arm, E, for operating it, and both plates are hung eccentrically within a common casing, F, so that the handle of each will project upon opposite sides of the gate, the one upon the outside and the other upon the inside; the two inner corners of the plates or bolts D bearing against a centre cross-bar or partition, G, of the casing F.

Figure 1:
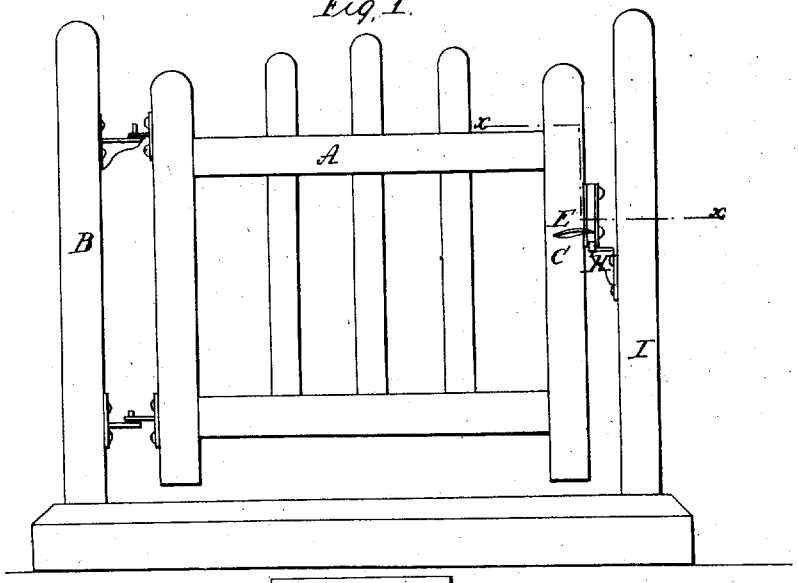
Figure 1 is an elevation of a gate, showing my invention applied thereto.
Figure 2:
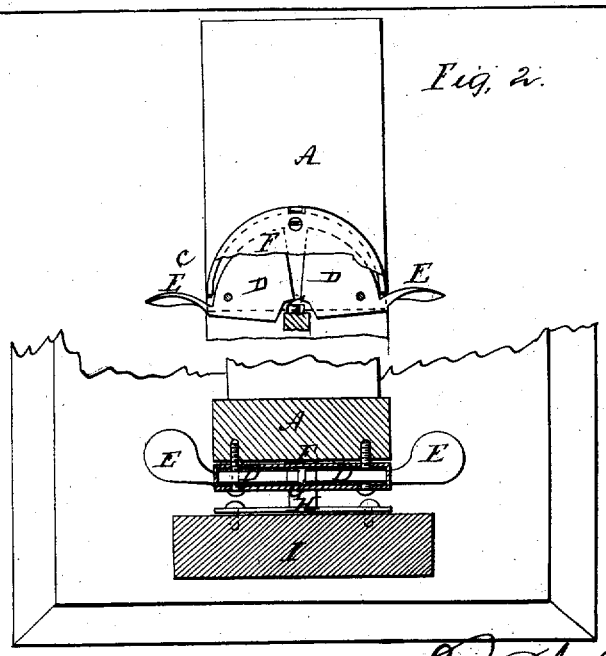
Figure 2 is a transverse section of an improved latch, taken on the plane of the line *x x*, fig. 1.

H is a lug or projecting piece, secured to and projecting from the fence-post I, in proper position for the latches D D to engage therewith, as plainly shown in fig. 2, the two latches, when engaged with the said catch, preventing the gate from being swung either inward or outward, but allowing the same to be opened in either direction, accordingly as to which latch or plate is relieved therefrom, by pressing upon its handle or arm E. The latches fall by their own weight or gravity, and by using two, as explained, it is plain to be seen that it is impossible for the gate to ever swing through the fence, no matter whether closed from the outside or inside, as either one or the other of the two latches is in a position to form a stop or bearing for the catch.

I wish it to be clearly understood that my invention embraces the arrangement of a gate-catch, composed of one or more vertically-rising drops or bolts, horizontally across the face of the front stile of the gate, when used in combination with a lug or projecting piece secured to the fence-post at the front of the gate. This arrangement of the catch enables an operator to open the gate, either toward or from him, with one hand, and thereby very easily and conveniently.

I will here state, that I am aware that automatic gate-catches have been used, (as, for instance, in the patents of Henry Last, issued November 22, 1864, A. E. Morgan, July 28, 1859, and W. W. Robinson, October 6, 1863,) but in all cases before my invention, so far as I am aware, they have been secured to the fence-post, and not to the gate. With catches so arranged, it is either necessary to employ devices for releasing the lug or projecting piece from the catch, (not the catch from the lug or projecting piece,) which greatly increases the expense of the device and the labor of applying it, to say nothing of its cost and liability to get out of order, or else it is necessary to employ both hands for opening the gate, one for releasing the catch, and the other for moving the gate, which is inconvenient and embarrassing. But by arranging the catch horizontally across the face of the front stile of the gate, the latter can be opened with one hand, and therefore much more easily and conveniently; and moreover, such arrangement dispenses with devices for operating the lug or projection, and the expense of applying the same to the gate.

I am also aware of a gate-catch, described in an application of C. S. and J. G. Lucas, filled and rejected in 1857, wherein a perpendicularly-arranged vertically-moving bolt is employed. By reference to the drawing in said application, it will be seen that the said perpendicular bolt operates, in all respects, like an ordinary old-fashioned gate-latch, and that it is just as liable to swing past its socket, in closing the gate, as the said old-fashioned latch. In addition to the advantages already stated, as being possessed by my invention, it possesses the further advantage of never permitting the gate to swing past the line of the fence when it is hurriedly closed. A material difference, therefore, exists between my invention and that shown in the application of the Messrs. Lucas. I will, however, state that I particularly disclaim the arrangement of a perpendicular bolt, as shown and described in the said application of the said C. S. and J. G. Lucas.

Having thus described my invention,

What I claim as new, and desire to secure by Letters Patent, is—

1. The arrangement, horizontally across the face of the front stile of a gate, of one or more eccentrically-hung dogs or plates, provided with a handle or handles, when used in combination with a stationary lug or projecting piece, secured to the fence-post, substantially as herein specified.

2. A latch for gates, consisting of two eccentrically-hung bolts or plates, D, provided with handles or arms, E, and arranged within an enclosing-case, F, in combination with a lug or projecting piece, H, substantially as herein specified.

R. A. LEEDS.

Witnesses:
M. M. LIVINGSTON,
JOHN R. COOPER.